United States Patent [19]
Day et al.

[11] Patent Number: 6,065,096
[45] Date of Patent: May 16, 2000

[54] INTEGRATED SINGLE CHIP DUAL MODE RAID CONTROLLER

[75] Inventors: Brian A. Day, Colorado Springs, Colo.; Bret S. Weber, Wichita, Kans.; Mark J. Jander, Colorado Springs, Colo.

[73] Assignee: LSI Logic Corporation, Milpitas, Calif.

[21] Appl. No.: 08/941,435

[22] Filed: Sep. 30, 1997

[51] Int. Cl.[7] .................................................. G06F 13/00
[52] U.S. Cl. ..................... 711/114; 711/112; 364/DIG. 1; 371/49.1
[58] Field of Search .................................. 711/114, 113, 711/100, 162, 4, 112; 345/424; 710/16, 129; 364/DIG. 1; 371/49.1

[56] References Cited

U.S. PATENT DOCUMENTS

| | | | |
|---|---|---|---|
| 5,257,391 | 10/1993 | DuLac et al. | 395/800 |
| 5,548,783 | 8/1996 | Jones et al. | 710/16 |
| 5,617,530 | 4/1997 | Stallmo et al. | 711/114 |
| 5,634,033 | 5/1997 | Stewart et al. | 711/114 |
| 5,682,509 | 10/1997 | Kabenjian | 710/129 |
| 5,761,705 | 6/1998 | DeKoning et al. | 711/113 |
| 5,802,546 | 9/1998 | Chisholm et al. | 711/100 |

FOREIGN PATENT DOCUMENTS

| | | |
|---|---|---|
| 0632379 | 1/1995 | European Pat. Off. . |
| 9409436 | 4/1994 | WIPO . |

*Primary Examiner*—John W. Cabeca
*Assistant Examiner*—Fred F. Tzeng

[57] ABSTRACT

A RAID controller integrated into a single chip. The RAID controller chip includes a general purpose RISC processor, memory interface logic, a host CPU PCI bus, at least one back-end I/O interface channel, at least one direct memory access (DMA) channel, and a RAID parity assist (RPA) circuit. The RAID chip enables higher integration of RAID functions within a printed circuit board and in particular enables RAID function integration directly on a personal computer or workstation motherboard. The back-end I/O interface channel is preferably dual SCSI channels. The RAID chip is operable in either of two modes. In a first mode, the chip provides pass through from the host CPU interface directly to the dual SCSI channels. This first mode of operation, a SCSI pass-through mode, allows use of the chip for non-RAID storage applications and enables low level manipulation of the disk array in RAID applications of the chip. The first mode of operation permits use of the chip without change to host applications and drivers. Rather, the chip is operable in a manner compatible with known available SCSI controller devices. The second mode of operation, a RAID control mode, provides full RAID management features to the attached host CPU. In the preferred embodiment, the RAID chip presents an Intelligent I/O (I2O) interface to the host CPU to enhance portability and performance of the host/RAID interaction.

7 Claims, 2 Drawing Sheets

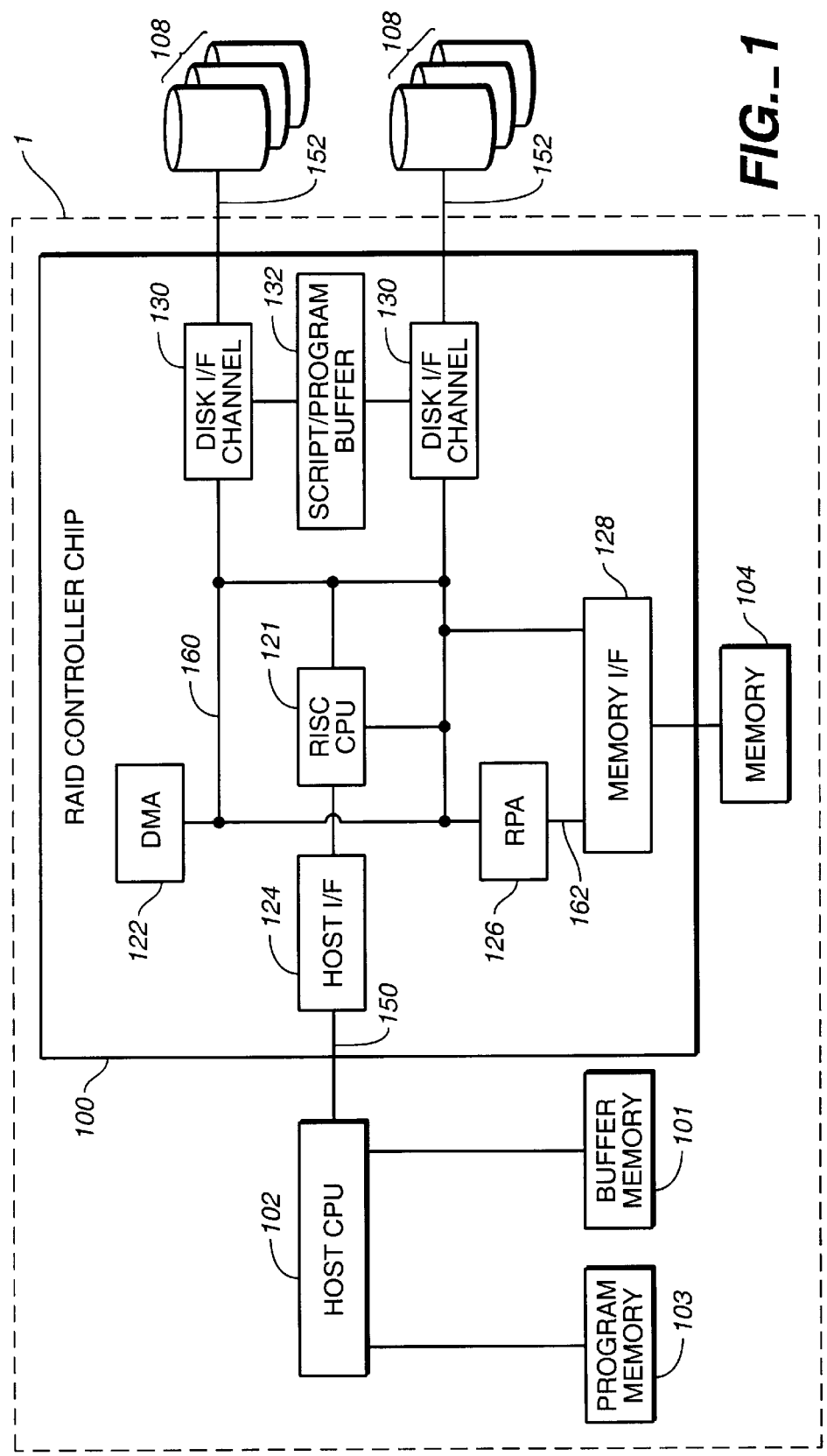
FIG._1

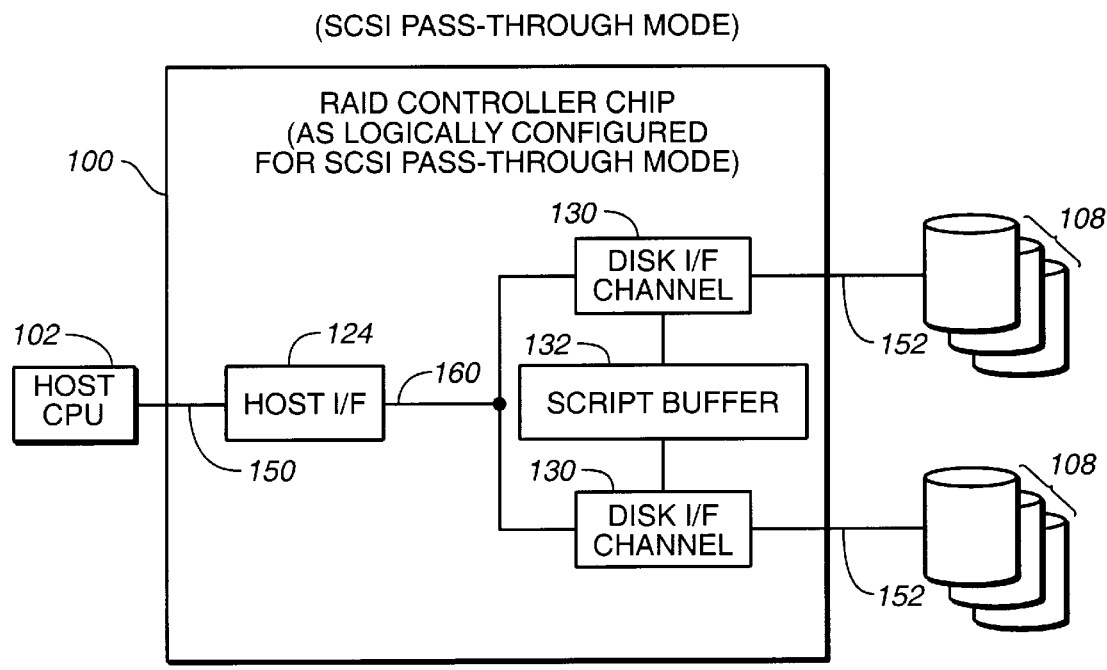
FIG._2
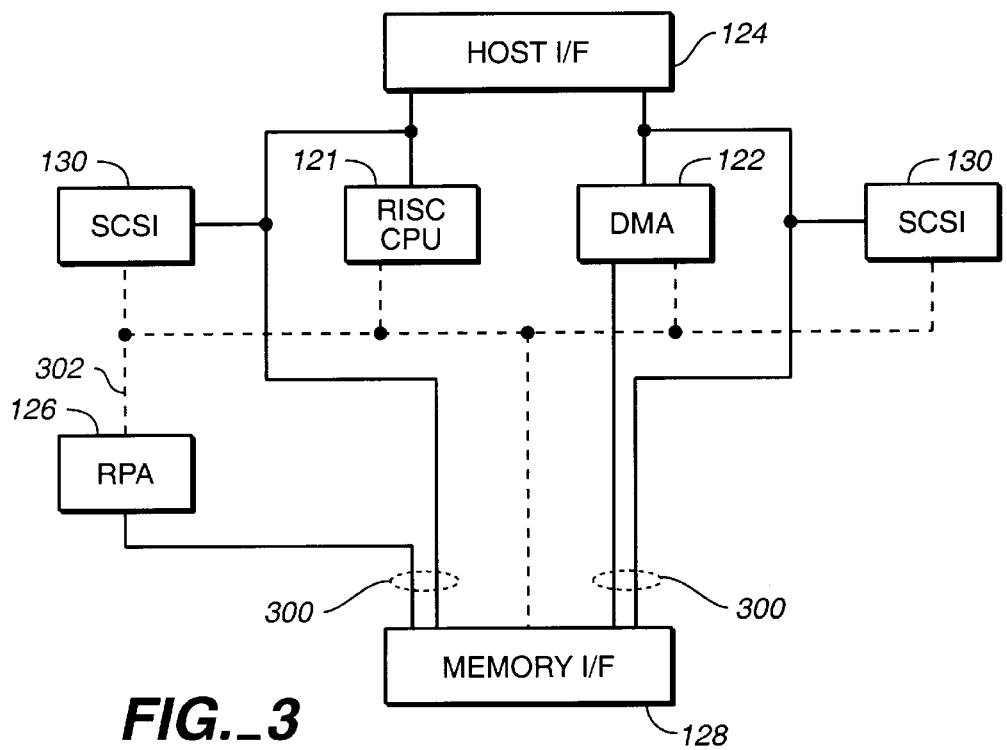
FIG._3

INTEGRATED SINGLE CHIP DUAL MODE RAID CONTROLLER

BACKGROUND OF THE INVENTION

1. Field of the Invention

The present invention relates generally to RAID storage controllers and in particular to a single chip integrated circuit which provides full RAID functionality along with a substantial decrease in complexity and associated costs.

2. Discussion of Related Art

RAID storage subsystems are known to provide high storage capacity, fast storage access, and highly reliable operation. In general, RAID subsystems comprise an array of inexpensive disk drives operated by a RAID controller which presents the array to attached host systems as though operating as a single large, fast, reliable single disk drive. The RAID controller maps requests from attached host systems into appropriate requests to the array of disk drives.

Many current RAID controllers implement various, if not all, of the presently popular RAID architectures. Referred to as RAID levels 0 through 5, each RAID architecture utilizes the array of disk drives in a manner to provide enhanced performance and reliability. The various RAID levels correspond to varying geometries in the configuration of the disk drives of the disk array. For example, a simple RAID 1 configuration calls for exact mirroring of the contents of a first disk drive on a parallel or mirrored second drive. This architecture does not affect performance of the subsystem in any appreciable manner but does enhance reliability of the data storage. RAID level 5 by contrast entails a more complex mapping of the data on the disk array. Host supplied data is distributed over a plurality of drives in the disk array. This feature diminishes subsystem reliability but enhances performance by utilizing parallel transfers of data over multiple I/O channels to multiple disk drives. To restore required reliability, RAID level 5 uses redundancy information stored on another drive in the disk array. The redundancy information is used to recover lost data in case of failure of one of the disk drives in the disk array.

Addition of the redundancy (e.g., parity) data to recover reliability imposes a performance cost on the RAID controller by requiring the update of redundancy (e.g., parity) information in response to updates of the associated data. To reduce the negative performance impact of this well known RAID write penalty, most RAID controllers utilize significant amounts of cache memory to buffer write operations and thereby reduce the perceived performance impact of maintaining redundancy information.

As RAID features have evolved and performance demands have increased, RAID controllers have grown into large, complex, and hence costly devices. Typical RAID controllers comprise a printed circuit board with a general purpose processor, RAM and ROM devices for storage of operating code and variables, and I/O interface controllers for connection to attached hosts systems and connected disk drives. High performance RAID controllers increase the amount of cache memory and add custom circuits for DMA transfers and/or parity computation assist.

It is presently common for personal computer system main boards (e.g., motherboards) to incorporate storage controllers. Such motherboard integration further reduces costs and complexity by reducing the needs for connectors and external bus connections between the storage controller and related motherboard devices.

As demand for high performance, high reliability RAID storage increases, so increases the demand for lower cost RAID controller solutions. It is evident from the above that a need exists for a simpler, lower cost RAID controller architecture to enable lower cost and complexity associated with high performance and high reliability storage subsystems. In particular it is evident from the above that a need exists for a highly integrated RAID storage controller which can be easily integrated with personal computer or workstation motherboards.

SUMMARY OF THE INVENTION

The present invention solves the above and other problems, thereby advancing the state of the useful arts, by providing a highly integrated single chip RAID controller. The RAID controller of the present invention integrates onto a single integrated circuit a general purpose processor, at least one back-end interface channel, a host connection interface channel, a redundancy (e.g., parity) computation assist circuit, high performance DMA controllers, and logic required to connect memory devices for programmed instruction storage, for variable storage space, and for caching of RAID operations. The single chip RAID controller can be simply integrated onto a personal computer or workstation motherboard to provide low cost, high performance RAID storage control.

Specifically, the RAID controller chip of the present invention includes a reduced instruction set computer (RISC) processor to control overall operation of the RAID controller. Memory interfaces associated with the RISC processor enable connection of ROM and RAM memory devices for processor operation (e.g., program instruction and variable storage) as well as memory for RAID caching operations. Such memory devices may be integrated within the RAID controller chip to further reduce complexity and cost. However, in the preferred embodiment, such memory devices remain external to the RAID controller chip, connected via memory interface busses, to permit flexibility in selection of memory types and sizes.

The RAID controller chip of the present invention further comprises at least one back-end I/O interface channel to connect the RAID chip to storage devices controlled by the controller chip. In the preferred embodiment, the RAID chip includes dual SCSI interface channels to provide connection to redundant SCSI channels and attached disk drives. More generally, the back-end I/O interface channel(s) may be any interface bus and/or protocol for connecting disk drives. For example, the back-end interface channel could be a PCI bus to which PCI compatible devices are externally attached to the circuit of the present invention. Exemplary of such devices are PCI compatible SCSI control interface chips or other disk interface circuits. Such an alternative configuration allows the disk interface connections and protocols to be more flexibly selected but at the cost of less integration within the circuit of the present invention.

The RAID controller chip also includes host processor interface circuits to connect the RAID controller chip to a host CPU. In the preferred embodiment, the host interface is a Peripheral Component Interface (PCI) bus. In addition, programmed instruction processes operable within the RISC processor of the controller chip preferably provide an Intelligent I/O (I2O) compatible interface between the host CPU and the RAID controller chip of the present invention.

Additionally, the RAID controller chip of the present invention preferably includes at least one direct memory access (DMA) channel to permit direct manipulation of the memory associated with the chip with minimal impact on RISC processor performance. The RAID chip may also include a RAID parity assist (RPA) circuit to aid in the frequent computation of parity information for RAID redundancy.

The high level of integration provided by the RAID chip of the present invention permits a fully functional RAID controller to be integrated within a personal computer or workstation motherboard or otherwise integrated into a computing system with minimal complexity and cost.

Processes operable within the RAID controller chip of the present invention permit the chip to be operated in at least two modes in accordance with the present invention. In a first mode of operation, the RAID controller chip simply provides pass through access from the host interface to its dual SCSI back-end I/O interface channels. In this mode, the RAID controller chip serves to provide only a dual bus SCSI interface for use by the host CPU. This mode is useful to enable use of the circuit in conjunction with host CPU and associated applications and drivers without requiring changes thereto. Rather, the circuit of the present invention, operable in the pass through mode, is seen by the host CPU as compatible with standard, commercially available disk controllers. No alterations are required of the host CPU or software operable therein to make use of the circuit of the present invention when operating in this compatible, pass through mode.

A second mode of operation of the RAID controller chip provides full RAID control features for a disk array attached to the dual SCSI channels of the chip. The host CPU therefore interacts with a full featured RAID subsystem connected and controlled via the RAID chip of the present invention. In one variant of this mode of operation, the RAID controller chip provides a custom or proprietary RAID command structure interface to the attached host CPU via the PCI bus. In a second, preferred variant of the second mode of operation, the RAID controller chip of the present invention presents an I2O compatible interface to enable intelligent interfacing between the host CPU and the RAID controller chip of the present invention.

It is therefore an object of the present invention to provide a single integrated circuit RAID controller.

It is a further object of the present invention to provide a single integrated circuit RAID controller operable in a back-end I/O pass-through mode.

It is a further object of the present invention to provide a single integrated circuit RAID controller operable in a SCSI pass-through mode.

It is still a further object of the present invention to provide a single integrated circuit operable in a first mode as a RAID controller and in a second mode as a SCSI controller.

It is yet a further object of the present invention to provide a single integrated circuit operable in a first mode as a RAID controller and in a second mode as a multi-channel disk controller.

It is yet a further object of the present invention to provide a single integrated circuit operable in a first mode as a RAID controller and in a second mode as a multi-channel SCSI controller.

It is another object of the present invention to provide a single integrated circuit RAID controller which may be integrated on a personal computer or workstation motherboard.

It is still another object of the present invention to provide a single integrated circuit RAID controller operable in a back-end I/O pass-through mode and which may be integrated on a personal computer or workstation motherboard.

It is still another object of the present invention to provide a single integrated circuit RAID controller operable in a SCSI pass-through mode and which may be integrated on a personal computer or workstation motherboard.

It is still yet another object of the present invention to provide a single integrated circuit operable in a first mode as a RAID controller and in a second mode as a multi-channel disk controller and which may be integrated on a personal computer or workstation motherboard.

It is still yet another object of the present invention to provide a single integrated circuit operable in a first mode as a RAID controller and in a second mode as a multi-channel SCSI controller and which may be integrated on a personal computer or workstation motherboard.

The above and other objects, aspects, features, and advantages of the present invention will become apparent from the following description and the attached drawings.

BRIEF DESCRIPTION OF THE DRAWINGS

FIG. 1 is a block diagram of the RAID controller chip of the present invention depicted at a higher level which incorporates the best presently known mode of practicing the invention as well as other embodiments;

FIG. 2 is a block diagram logically depicting the components of FIG. 1 which are essential to operate in the SCSI pass-through mode of operation; and FIG. 3 is a block diagram describing logical communication paths of the RAID controller chip of FIG. 1.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting the RAID controller chip 100 of the present invention as applied in a personal computer or workstation motherboard 1. As shown in FIG. 1, RAID controller chip 100 (hereinafter also referred to as ROC) includes a local processor 121, a host interface 124, a memory interface 128, and dual back-end I/O interface channels 130. ROC 100 is shown in a typical motherboard 1 application as a component of the motherboard 1. Also present in such an application of ROC 100 is a host CPU 102 and its associated program memory 103 and buffer memory 101. Separate external memory 104, resident on motherboard 1, is coupled to ROC 100 through memory interface 128. External memory 104 stores, for example, instructions and variables for execution of processor 121. Further, external memory 104 may store data for caching operations in a RAID mode of operation (discussed below).

Processor 121, back-end I/O interface channels 130, memory interface 128, and host interface 124 all exchange information via processor bus 160. Processor bus 160 is a bus internal to ROC 100 which may be either unique to processor 121 or may be any of several industry standard busses including, for example, a PCI bus.

Back-end I/O interface channels 130 attach ROC 100 to a plurality of disk drives 108 via paths 152. Paths 152 may be any of several well known communication medium applying any of several well known protocols. For example, paths 152 may be parallel SCSI, Fibre Channel, SSA, IPI, EIDE, PCI, etc. In the preferred embodiment, back-end I/O interface channels 130 and paths 152 are SCSI compatible controller circuits within ROC 100 to allow connection of a wide variety of readily available high performance disk drives.

ROC 100 communicates with host CPU 102 via host interface 124 and bus 150. In the preferred embodiment of ROC 100, bus 150 is an industry standard PCI or other interface bus and host interface 124 is adapted to exchange signals between processor bus 160 and PCI bus 150. Those skilled in the art will readily recognize that ROC 100 of the present invention may be implemented as shown in FIG. 1 as integrated on a motherboard 1. Alternatively, ROC 100 may be integrated on an adapter card which plugs into an industry standard connector extending the signals of bus 150. Further, ROC 150 may be applied in storage subsystems standing independent of a host system and connected to host systems via other industry standard interconnections (e.g., Fibre Channel or SCSI). However, such subsystems applications of ROC 100 tend to underutilize the integration aspects of the present invention. Such subsystem applications of ROC 100 are therefore not anticipated as common applications of the methods and apparatus of the present invention.

Processor 121 in ROC 100 is preferably a reduced instruction set computer (RISC) circuit possessing performance properties required for full featured RAID control features. In particular, in the best presently known mode of practicing the invention, processor 121 is preferably an ARM7TDMI device (as available from Advanced RISC Machines, Ltd., 90 Fulbourn Road, Cherry Hinton, Cambridge, CB1 4JN England).

In addition, in the preferred embodiment of ROC 100, a direct memory access controller 122 (also referred to herein as DMA) and a RAID parity assist circuit 126 (also referred to herein as RPA) are included to further enhance performance of ROC 100. DMA 122 and RPA 126 also exchange information with other components within ROC 100 via processor bus 160 as discussed above. Those skilled in the art will readily recognize that DMA 122 and RPA 126 are not required for basic operation of ROC 100 as described herein. Inclusion of RPA 126 and DMA 122 enhances performance of ROC 100 by offloading tasks from general purpose processor 121.

Specifically, DMA 122 reduces the load on processor 121 for exchanging data among an attached host CPU, interface channels 130, RPA 126, and memory devices (e.g., memory 104) attached to ROC 100 through memory interface 128. DMA 122 is a standard cell library component compatible with any of several well known DMA architectures. Simple DMA transfer techniques may be used therein as well as so-called scatter/gather DMA techniques. Those skilled in the art will recognize the design choices available in a particular standard cell library and select any of several such compatible DMA components.

RPA 126 is any circuit, as known in the RAID controller arts, which provides specific assistance to processor 121 for RAID redundancy data computations (e.g., XOR parity computations). As is known in the art, such parity assist logic improves overall performance of a RAID controller by improving the speed of frequent XOR parity computations.

Back-end I/O interface channels 130, as noted above, are preferably SCSI controller circuits for connection of commercially available high performance disk drives. In particular, back-end I/O interface channels are preferably standard cell library versions of a SCSI controller core such as the 53C875 or 53C895 as available from Symbios Logic, Inc. More precisely, such standard cell libraries may include functionally similar features of the commercially available circuit but broken out in a "macro" form to permit easier integration within a single integrated circuit. Two such 53C875 SCSI controllers are functionally combined in the 53C876 device also available from Symbios Logic, Inc. Similarly, dual 53C895 SCSI controllers are functionally combined in the 53C896 device from Symbios Logic, Inc. Such SCSI controller circuits as defined within standard cell libraries are also referred to herein as SCSI controller cores or simply SCSI cores.

These SCSI controllers (interface channels 130) perform SCSI operations in accordance with a script command language. Script "programs" are constructed by an attached processor and downloaded into a script buffer 132 associated with the SCSI cores. A script processor (not shown) within each SCSI core (130) stores and later retrieves the script commands in the sequence required and performs the operations associated therewith.

In the best presently known mode of practicing the invention, buffer 132 is integrated within each SCSI core 130. In particular, preferred devices such as the above identified Symbios 53C8XX series integrates a 4 KB buffer for script storage within the SCSI core 130 per se. This script buffer integrated within the SCSI core 130 is inaccessible by processor 121. Scripts are transferred from processor 121 to the SCSI cores 130 over processor bus 160 and stored, by the SCSI core 130, in the internal script buffer of the receiving SCSI core 130.

Alternative embodiments readily recognized by those skilled in the art may share buffer 132 in a manner to allow shared access by processor 121. In such a configuration, buffer 132 may also be connected to processor 121. When processor 121 controls operation of SCSI controller cores (130), processor 121 determines the use of buffer 132. In particular, processor 121 may utilize buffer 132 for general program storage including instructions and/or data. Alternatively, processor 121 may dedicate the use of buffer 132 to SCSI cores (130) for use, as noted above, as a script buffer.

As is discussed below in additional detail, ROC 100 is operable in two distinct modes. In a first mode, an unintelligent mode (also referred to herein as a SCSI pass-through mode), ROC 100 is operable in a manner essentially compatible with a Symbios 53C876 dual SCSI channel interface. In the second mode, processor 121 controls operation of ROC 100 to perform full RAID management for attached disk arrays 108.

In the best presently known mode of practicing the invention, circuits (not shown) in ROC 100 determine which mode to initialize when power is applied to ROC 100. For example, these circuits determine whether memory 104 is connected to ROC 100. If a memory 104 is detected on power up of ROC 100, the initialization circuits release a reset signal applied to processor 121 to enable it to begin operations and control ROC 100 for performing full RAID management. If no memory 104 is sensed, the initialization circuits hold processor 121 in a reset state (or other equivalent nonfunctioning state such as a low power mode). With processor 121 in such a reset state, SCSI cores 130 (and therefore ROC 100) are operable in a SCSI pass-through mode to permit direct access by host CPU 102 to SCSI cores 130 (via host interface 124).

In initialization and operation of this pass-through mode, processor 121 is preferably completely idle. Other embodiments readily apparent to those skilled in the art permit processor 121 to initialize and programmatically determine the preferred mode of operation. In such alternate embodiments, processor 121 may inspect configuration options or receive configuration instructions from a host system to determine which mode to initialize. However, to initialize the pass-through mode in such alternate embodiments, processor 121 does little more than initialize ROC 100 by resetting various controls and mapping address ranges within ROC 100 for direct access by an attached device through host interface 124.

In the SCSI pass-through mode of operation, no RAID or other management techniques are performed within ROC 100. Rather, this mode allows ROC 100 to be used as a "dumb" SCSI controller where RAID management is not required.

In a second mode of operation (also referred to herein as a RAID control mode), processor 121 controls essentially all operation of SCSI cores (130) to apply RAID management techniques to the disk drives attached thereto. Any requests from devices attached through host interface 124 (e.g., host systems 102) are directed to processor 121 for interpretation and processing. As noted above, in particular, processor 121 in conjunction with host interface 124 preferably provides and I2O compatible interface to attached host systems.

FIG. 2 is a block diagram which depicts the logical configuration of ROC 100 of FIG. 1 when operating in the first mode, the unintelligent mode, essentially compatible with a Symbios 53C876 dual SCSI controller. Once initialized in this mode by operation of processor 121 of FIG. 1, several elements associated with RAID operations are essentially idle and therefore not shown in the logical configuration of FIG. 2. For example, processor 121, RPA 126, memory 104, and DMA 122 are essentially unused when ROC 100 is operable in the dumb mode (those skilled in the art will recognize that memory interface 128 is used to access BIOS code in a ROM (not shown) for motherboard boot processing). Rather, interface channels 130 (SCSI cores) are directly accessible by attached host processors 102 through bus 150 (e.g., PCI bus), host interface 124, and processor bus 160. Script commands are generated directly by a host processor 102, transferred via bus 150, host interface 124, and bus 160 to the SCSI core (130) and thereby temporarily stored in script buffer 132. The SCSI core is then controlled by the same host processor 102 via the same communication path to initiate the processing requests embodied in the script commands stored in the script buffer 132. Host processor 102 thereby retains complete control over the processing and management of disk drives 108 attached through ROC 100 via paths 152.

In the second, RAID management, mode of operation of ROC 100, processor 121 of FIG. 1 retains all control over SCSI cores (130). Scripts for operation of SCSI cores (130) are generated by processor 121 to control the attached disk drives rather than attached host processors (e.g., 102).

More importantly, in this second mode of operation, processor 121 and related components perform full RAID management of the attached disk drives 108. Information and associated redundancy information pursuant to RAID management techniques are generated by processor 121 and distributed over disk drives 108 in accordance with the RAID management techniques configured for each storage area (e.g., RAID LUN).

In this second mode of operation, processor 121 is operable in conjunction with DMA 122, RPA 126, and memory devices attached through memory interface 128 to perform full RAID management. Overall operation of ROC 100 to perform RAID management is in accordance with well known principles of operation of prior RAID controllers. However, the high level of integration of ROC 100 permits substantial savings in complexity and associated costs as compared to prior designs. In addition, the dumb mode of operation integrated within ROC 100 of the present invention permits the device to be used in applications where RAID management is not required. A single circuit of the present invention may be easily and simply applied to both RAID and non-RAID storage applications with a high level of integration in the underlying computing application.

FIG. 3 is a block diagram describing the logical communication paths (busses) interconnecting the principle components within ROC 100. As noted above, in the SCSI pass-through mode of operation, a host CPU 102 of FIG. 1 communicates directly with the SCSI cores 130. Bus (logical communication path as shown in FIG. 3) 300 provides direct connection (via host interface 124) between a host CPU 102 (not shown in FIG. 3) and SCSI cores 130.

In the RAID management mode of operation of ROC 100, processor 121 and DMA 122 communicate directly with host CPU 102 via host interface 124. Processor 121 receives RAID storage related commands from host CPU 102 via bus 300. DMA 122 exchanges data with a host CPU 102 via bus 300. However, processor 121, in performing its RAID management functions communicates with SCSI cores 130, RPA 126, DMA 122, and memory devices via memory interface 128, all over bus (communication path) 302. Bus 302 is internal to ROC 100 and (generally) inaccessible to external devices other than through indirect requests processed by processor 121.

Those skilled in the art will recognize that busses 300 and 302 are intended only to represent logical connections and communication paths among the various components of ROC 100. Busses 300 and 302 do not, necessarily, represent physical bus or other connections among the components. Actual physical connections and multiplexing of busses is a matter of design choice well known to those skilled in the art.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A RAID controller integrated into a single integrated circuit chip comprising:

a general purpose processor;

at least one back-end I/O interface channel coupled to said general purpose processor for connecting to an array of disk drives;

a host CPU interface coupled to said general purpose processor for connecting to a host CPU; and a memory interface coupled to said general purpose processor for connecting said processor to memory devices, wherein said RAID controller is operable in a first mode to pass through SCSI operations and status between said host CPU interface and said at least one SCSI disk interface channel, and wherein said RAID controller is alternatively operable in a second mode to perform RAID management on behalf of said host CPU via said host CPU interface.

2. The integrated circuit chip of claim 1 further comprising:

a RAID parity assist circuit coupled to said at least one back-end I/O interface channel and coupled to said memory interface and coupled to said general purpose processor, wherein said RAID parity assist circuit aids said general purpose processor in performing XOR parity computations for data stored on said array of disk drives connected to said at least one back-end I/O interface channel.

3. The integrated circuit chip of claim 2 further comprising:

at least one DMA channel coupled to said host CPU interface and coupled to said general purpose processor and coupled to said at least one back-end I/O interface channel and coupled to said memory interface and coupled to said RAID parity assist circuit, wherein said at least one DMA channel performs direct transfers of data among said memory interface and said host CPU interface and said at least one back-end I/O interface and said RAID parity assist circuit.

4. The integrated circuit chip of claim 1 further comprising:

at least one DMA channel coupled to said host CPU interface and coupled to said general purpose processor and coupled to said at least one back-end I/O interface channel and coupled to said memory interface, wherein said at least one DMA channel performs direct transfers of data among said memory interface and said host CPU interface and said at least one back-end I/O interface channel.

5. The integrated circuit chip of claim 1 wherein said at least one back-end I/O interface channel includes:

a first SCSI interface channel; and a second SCSI interface channel.

6. The integrated circuit chip of claim 1 wherein said integrated circuit provides an I2O compatible interface to said host CPU via said host CPU interface.

7. The integrated circuit chip of claim 1 wherein said host CPU interface comprises:

a PCI bus compatible host CPU interface.

\* \* \* \* \*